J. W. LISKA.
LIQUID MIXING DEVICE.
APPLICATION FILED MAR. 19, 1920.

1,385,179.

Patented July 19, 1921.

Inventor:
John W. Liska
By Forée Bain & Hinkle
Attys.

UNITED STATES PATENT OFFICE.

JOHN W. LISKA, OF CHICAGO, ILLINOIS.

LIQUID-MIXING DEVICE.

1,385,179.     Specification of Letters Patent.     Patented July 19, 1921.

Application filed March 19, 1920. Serial No. 367,201.

*To all whom it may concern:*

Be it known that I, JOHN W. LISKA, a citizen of the United States, residing at Chicago, in the county of Cook and State of Illinois, have invented certain new and useful Improvements in Liquid-Mixing Devices, of which the following is a specification.

This invention relates to improvements in liquid mixing devices.

One of the objects of the invention is to provide a liquid mixing device especially designed and adapted to mix hot and cold water coming from two independent sources.

Another object is to provide a one piece structure attachable to the hot and cold water faucets, or bibs of a kitchen sink.

Another object is to provide a device, of the character described, having two integral conduit parts joined at their meeting ends by a nozzle, common to both, and an enlarged mixing chamber at the confluent ends of the conduit parts, the inner walls of the chamber so arranged as to divert the liquid temporarily from the nozzle into the mixing chamber from which it subsequently passes into and through the nozzle.

Another object is to provide a new and improved fastening means for securing the conduit ends to the respective faucets.

Other, further and more specific objects of the invention will become readily apparent, to persons skilled in the art, from a consideration of the following description when taken in conjunction with the drawings, wherein:—

In all the views the same reference characters are employed to indicate similar parts.

Figure 1:
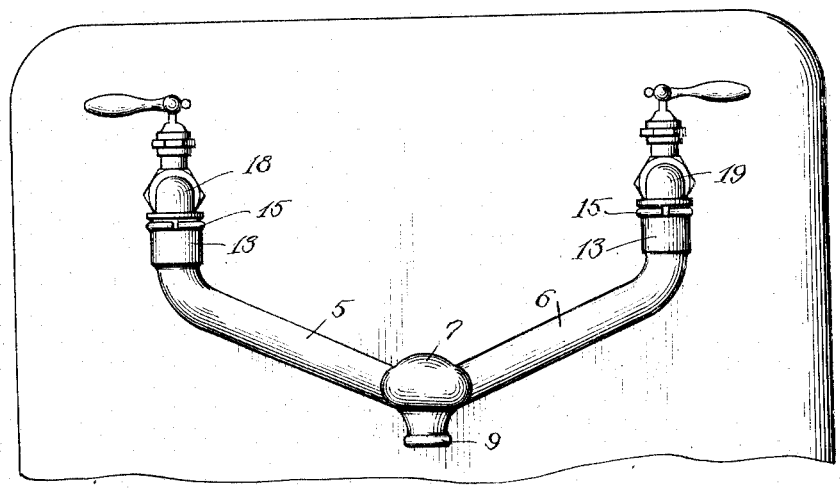
Figure 1 is an elevation of the device as it appears connected to two faucets, or kitchen bibs.
Figure 2:
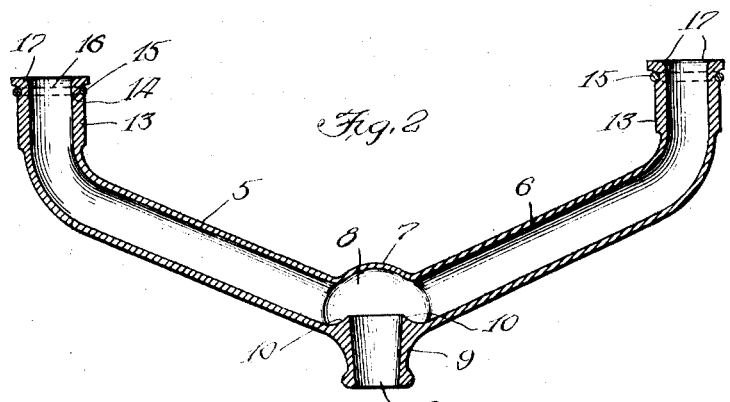
Fig. 2 is a central, longitudinal section of the device.
Figure 3:
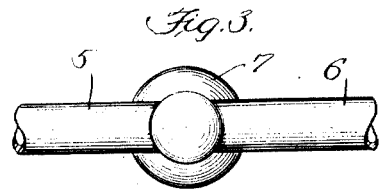
Fig. 3 is a plan view of a part of the device showing the part containing the mixing chamber.

The device is preferably made of a single piece of elastic rubber without any interconnected parts. The conduit part 5 is joined to the conduit part 6, as at 7, the part 7 encompassing a mixing chamber 8, into which projects a nozzle 9. At the inner terminal end of the nozzle, there is an upturned part 10 which causes the water, or the liquid coming through the conduits 5 and 6, to take an upward course toward the upper part of the chamber 7 and toward the opposite conduit. Here it meets the liquid coming from the opposite conduit and becomes thoroughly mixed before it changes its course. It then passes out through the opening 12 of the nozzle 9, so that the temperature of the water, coming out of the nozzle, is uniform and the water is not stratified in temperature. Each of the conduit ends, 5 and 6, is reinforced, as at 13, and is provided with a groove 14 within which is located an open spring ring 15, for the purpose of contracting the opening 16 in the end of the conduit. The opening 16 is also chamferred, as at 17, so that the end 13 may be easily put upon the end of the faucets or bibs 18 and 19, respectively. When the end 13 is forced upon the end of the bib, the spring ring 15 forcibly presses the underlying portion of the end 16 into frictional engagement with the end of the bib, thereby holding it in place. The elasticity of the ring 15 is sufficient to compensate for a considerable variation in the size of the end of the bib so as to permit universal application of the device for faucets of different makes, and by fixing the end 13, as shown in sections in Fig. 2, considerable advantage is obtained by the durability that is effected thereby.

Having described my invention what I claim as new and desire to secure by Letters Patent is:—

A liquid mixer comprising a one piece elastic liquid conductor having two conduits joined at their meeting ends by a part inclosing a mixing chamber; a nozzle, extending into the mixing chamber in the path provided by the conduits, and means within the chamber to divert the liquid from the conduit into the mixing chamber and away from the nozzle.

In testimony whereof I hereunto subscribe my name.

JOHN W. LISKA.